Patented Oct. 11, 1932

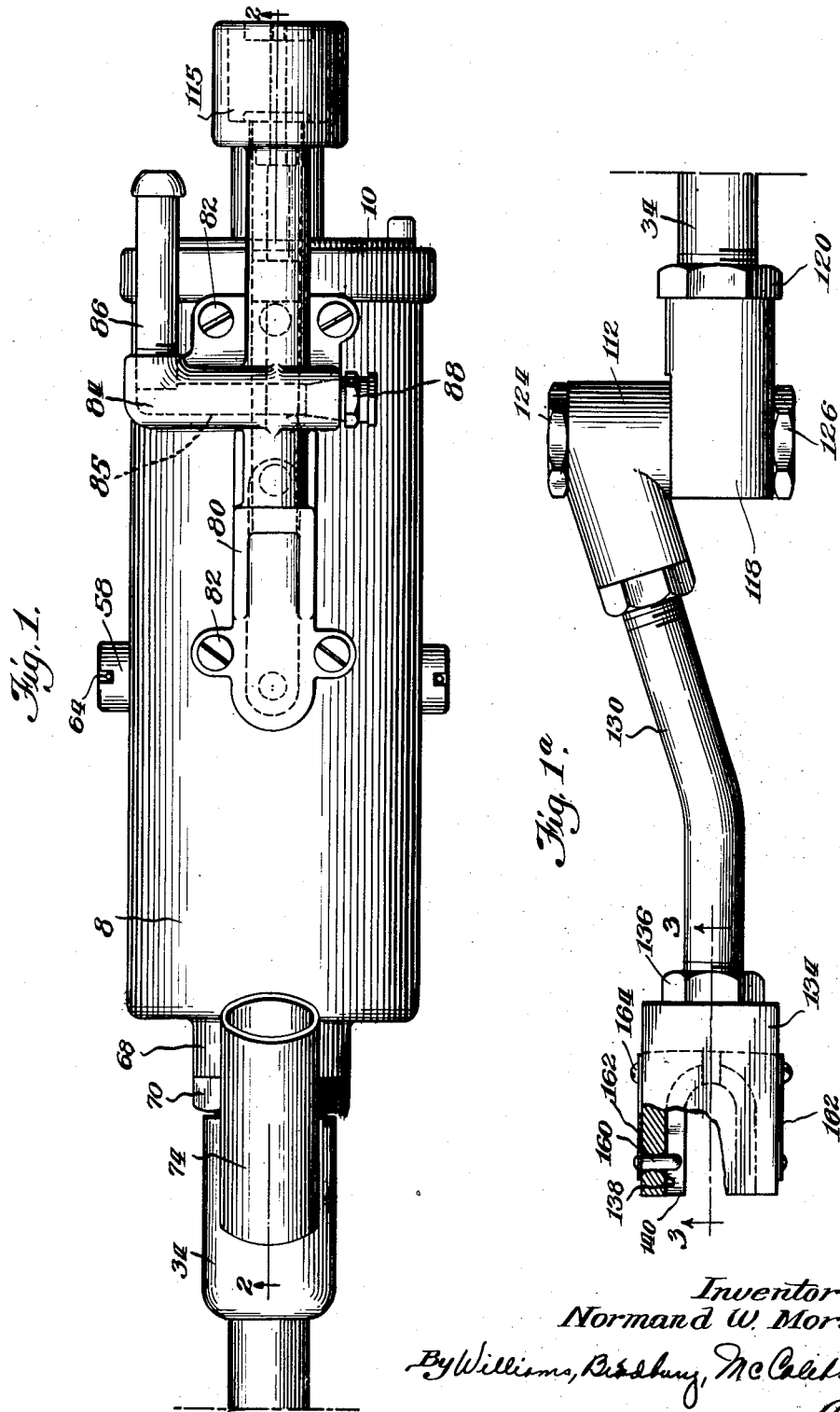

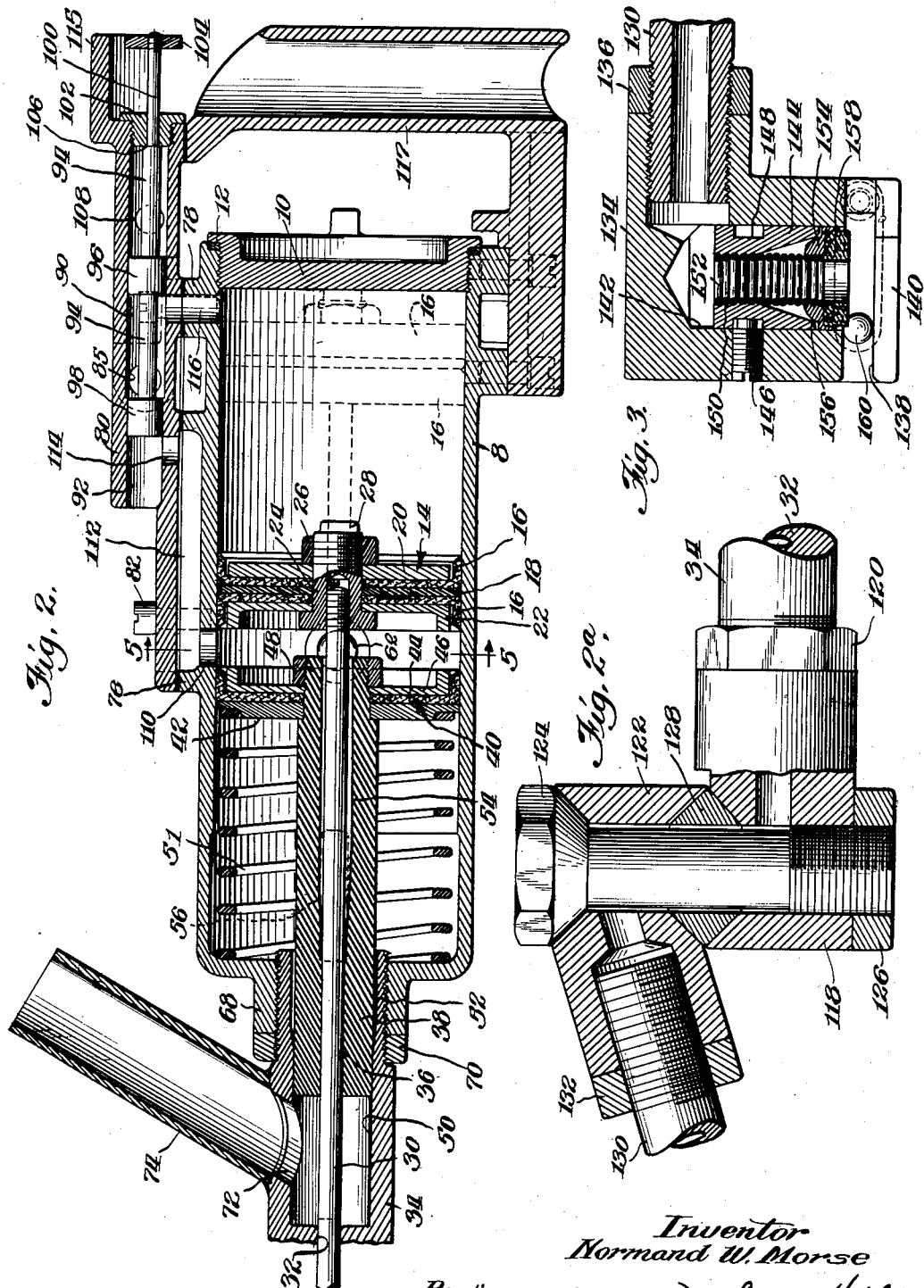

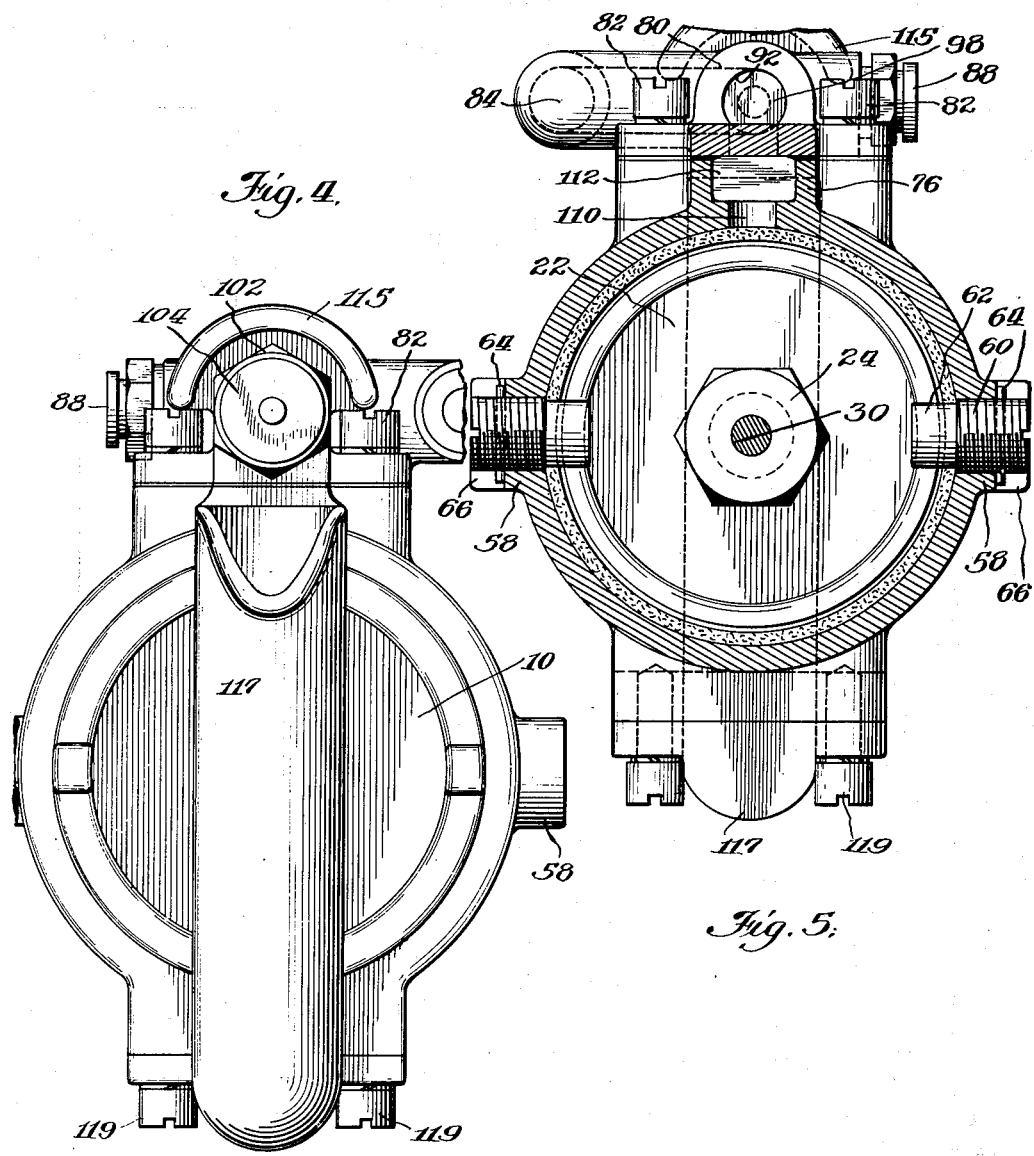

1,881,847

UNITED STATES PATENT OFFICE

NORMAND W. MORSE, OF CHICAGO, ILLINOIS, ASSIGNOR TO ALEMITE CORPORATION, OF CHICAGO, ILLINOIS, A CORPORATION OF DELAWARE

PNEUMATIC LUBRICANT COMPRESSOR

Application filed April 28, 1928. Serial No. 273,515.

My invention relates to lubricating apparatus and more particularly to pneumatic high pressure lubricant compressors of the type especially suited to force heavy lubricants under high pressure into the crank pin and other bearings of locomotives, although the compressors may of course be used for many other similar purposes.

In the lubrication of the crank pin and other bearings upon locomotives, a heavy lubricant of substantially the consistency of a hard soap and in the form of a cylindrical stick is used. In the past great difficulty has been experienced in forcing this lubricant into the bearings at sufficient pressure to insure the flow of the lubricant between the surfaces of the bearing and the moving part in the bearing. Several methods have been employed but in each instance the operation of forcing the lubricant into the bearing has been a slow laborious task and there was no real assurance that the bearing had been properly lubricated after the operation was completed. To overcome the disadvantages of the prior methods of lubrication, I have provided a novel form of compressor which is capable of rapidly forcing lubricant into the bearing at very high pressures.

It is an object of my invention to provide an improved high pressure lubricant compressor which is pneumatically operated, first, to prime a high pressure cylinder with lubricant and then to force the lubricant from the high pressure cylinder under great pressure.

A further object is to provide an improved lubricant compressor having a compound pumping action.

A further object is to provide an improved controlling valve whereby air under pressure may be admitted to air cylinder inlet ports in proper sequence.

A further object is to provide an improved compound compressor in which the high and low pressure cylinders are in alignment and in which the high pressure plunger passes through the low pressure plunger.

A further object is to provide an improved pneumatically-operated lubricant compressor having a single air cylinder, and independently operable high and low pressure plunger actuating pistons operable in the air cylinder.

A further object is to provide an improved pneumatically-operated compressor which is simple in construction and operation and effective to force semisolid lubricants to bearings under high pressure.

Other objects will appear from the following description, reference being had to the accompanying drawings, in which Figs. 1 and 1—a together constitute a plan view of the compressor, its discharge conduit and coupling;

Fig. 2 is a vertical longitudinal sectional view taken on the line 2—2 of Fig. 1;

Fig. 2—a is an enlarged central horizontal sectional view of the swivel shown in Fig. 1—a;

Fig. 3 is a vertical sectional view of the coupling shown in Fig. 1—a;

Fig. 4 is an end elevation taken from the right of Fig. 1; and

Fig. 5 is a transverse vertical sectional view taken on the line 5—5 of Fig. 2.

The compressor is best illustrated in cross-section in Fig. 2 and comprises an air cylinder 8, one end of which is closed by a head 10 which is preferably screwed in place, a gasket 12 serving as a seal between the head and cylinder.

Within the cylinder 8 is a piston 14 composed of a pair of oppositely facing cup leathers 16 separated by a backing plate 18 and having face plates 20 and 22. These parts of the piston are clamped together by a bolt 24 having a nut 26. The end of the bolt has a projection 28 which serves as an abutment to limit the movement of the piston toward the cylinder head. The head of the bolt 24 is tapped to receive the high pressure plunger 30 which is slidable within the axial bore 32 formed in the lubricant cylinder casting 34.

The portion of the plunger near the piston 14 is guided in an axial bore 36 formed in low pressure plunger 38. The plunger 38 has a piston 40 secured at the end thereof, the piston comprising a backing plate 42, a cup leather 44, and a face plate 46, the three parts being secured to the low pressure plunger 38 by a nut 48. The low pressure plunger operates in a low pressure cylinder 50 formed in the casting 34 and is normally held in the position shown in Fig. 2 by a spring 51 which is compressed between the end of the cylinder 8 and the backing plate 42.

A portion of the low pressure cylinder of increased diameter, as indicated at 52, serves as a means for sealing the plunger in its cylinder since it will be noted that this portion 52 tapers gradually toward the cylinder 50 and thus forms a space in which any lubricant tending to escape past the plunger on the forward stroke thereof is trapped and "wedged". While the action of this seal is not clearly understood, it has been found to prove very effective and eliminates the necessity for a gasket or stuffing box.

The bore 36 in the low pressure plunger 38 is similarly enlarged at 54 to accomplish a similar purpose in sealing the plunger 30 in the bore 36.

A rectangular opening 56, shown in dotted lines in Fig. 2, is formed in the side wall of the cylinder 8 to prevent the compression of air in the cylinder upon the forward movement of piston 40. This opening also forms a convenient aperture for observing whether or not the low pressure plunger is operating properly.

As best shown in Figs. 1, 2 and 5, the cylinder 8 has a pair of laterally extending bosses 58 which are threaded to receive plugs 60, the latter having cylindrical portions 62 which project within the cylinder 8 and form stop abutments for the pistons 14 and 40, being engaged by the annular flange portions of the face plates 22 and 46. These plugs 60 are held against rotation by pins 64 passing diametrically through the plugs and fitting in slots 66 formed in the bosses.

The high and low pressure cylinder body 34 is threaded in an annular flange 68 formed at the end of the cylinder 8, being locked thereto by a nut 70. The low pressure cylinder 50 has an inlet opening 72 which is at an angle with the vertical and is a prolongation of the passageway in a feed tube 74 which is welded or otherwise suitably secured to the high and low pressure cylinder body 34.

The cylinder 8 has an upwardly extending rectangular flange 76 and a boss 78 upon which a piston slide valve body 80 is secured by means of four fillister head cap screws 82. The slide valve body has a laterally projecting portion 84 which has an axial bore 85 and adjacent its end has a transverse opening into which a nipple 86 is threaded. This nipple is adapted to be connected to an air hose.

The other end of the lateral projection 84 is threaded to receive a lubricant-receiving fitting 88 by means of which lubricant under pressure may be forced into the axial bore 85. The bore 85 communicates with a longitudinal cylinder 90 which has a portion 92 of slightly reduced diameter and one end of which is open to the atmosphere. A substantially balanced piston slide valve mechanism comprises a stem 94 to which are secured the piston valves 96 and 98, the piston valve 96 operating in portion of the cylinder 90 of relatively large diameter and the piston valve 98 operating in portion 92 of reduced diameter. The stem 94 has a reduced end portion 100 which is guided in a bushing 102 and at the end of which a thumb-piece 104 is secured. Outward movement of the slide valve assembly is limited by the abutment of a shoulder 106 with the inner face of the bushing 102. The cylinder 90 has a lateral port 108 open to the atmosphere.

The cylinder 8 has an inlet opening 110 which communicates with a passageway 112 formed between the cylinder wall and the slide valve body 80, the passageway 112 being connected with the portion 92 of the cylinder 90 through a port 114. The cylinder 8 is connected with cylinder 90 by a second air inlet port 116 adjacent the cylinder head 10.

Since the effective area of the piston valve 96 is greater than that of the piston valve 98, the piston valve mechanism will normally be held in its right-hand position, as shown in Fig. 2, by the air pressure. However, this differential pressure may readily be overcome by manual force on the thumb-piece 104.

A hollow handle 117 is secured to the cylinder 8 by means of fillister head cap screws 119 which are threaded in suitable bosses provided on the cylinder 8.

The valve body 80 has an arcuate projection 115 overlying the thumb-piece 104 forming a guard for the end 100 of the valve stem to protect the stem and prevent its accidental operation.

The outer end of the high and low pressure body 34 is threaded to the lower half 118 of a swivel, being locked thereto by a nut 120. The upper half 122 of the swivel is secured to the lower half by a bolt 124 which is threaded in the lower half 118, the bolt being locked to the lower half by a nut 126. The opposed faces of the swivel halves 118 and 122 are beveled inwardly to engage the surfaces of an annular sealing and antifriction ring 128. This ring is triangular in cross-section and is sufficiently rigid to permit the bolt 124 to be threaded tightly into the lower half 118. It will be noted that the lower surface of the head of the bolt 124 is beveled so as to engage and seal against a complementally beveled surface on the upper swivel half 122.

The upper swivel half has a conduit 130 threaded thereto, being locked in position by a nut 132. This conduit is bent so as to bring its outer end portion in substantial alignment with the cylinder 8 and has its outer end threaded into the coupling body 134, to which it is locked by a nut 136.

The coupling body 134, which is best illustrated in Figs. 1—a and 3, has a transverse undercut slot 138 at its lower end forming a substantially U-shaped flange 140. This flange is adapted to engage beneath the head of a lubricant-receiving nipple which is of a type well known in the art and of a form similar in general to the lubricant-receiving fitting 88 shown in Fig. 1.

The body 134 has a vertical bore 142 which is in communication with the conduit 130 and which forms a cylinder for a reciprocatory member 144. Movement of the member 144 within the bore 142 is limited by a headless set screw 146, the end of which projects within an annular groove 148 formed in the member 144.

The member 144 has an axial bore in which a helical groove 150 is formed to receive the coils of a closely wound spring 152. The lower end of this spring fits into a similar groove formed in a gasket retainer 154, the retainer having a substantially hemispherical surface engaging with a shoulder 156 at the lower end of the member 144. There is a small amount of clearance between the retainer and the bore. A centrally apertured gasket 158 is suitably secured in the retainer 154 and is adapted to engage the top of the fitting, and therefore is adapted to project slightly beyond the upper edge of the slot 138. The spring 152 holds the retainer in the position shown in Fig. 3 but permits the gasket to move universally to a limited degree so as to permit the face of the gasket 158 to conform to the top of the lubricant-receiving nipple. Upon application of lubricant pressure the member 144 is forced downwardly, its shoulder 156 pressing against the hemispherical surface of the retainer 154 and forming a seal. The downward pressure of the member 144 is thus communicated to the gasket which is thereby firmly pressed against the top end of the fitting, the pressure being augmented by lubricant pressure on the exposed surface of the retainer 154. The coupling herein described is more fully described and claimed in the co-pending application of Ernest W. Davis, Serial No. 275,030, filed May 4, 1928.

To prevent accidental uncoupling of the body 134 from the fitting, I have provided a pair of detent pins 160 which are carried upon the ends of leaf springs 162 and project inwardly through the side wall of the coupling into the slot 138. Leaf springs 162 are secured to the coupling body by screws 164.

The operation of the compressor is as follows:

Assuming that a compressed air supply hose is connected to the nipple 86, the coupling 134 is connected to a lubricant-receiving fitting and the compressor swung on the swivel to a position for convenient operation and a stick of grease manually fed into the tube 74 so as to project into the low pressure cylinder 50. The operator then presses the thumb-piece 104 inwardly, thereby permitting the air under pressure to flow from the bore 85 through port 114, passageway 112 and inlet port 110 into the cylinder 8 between the pistons 14 and 40. Thereupon the piston 14 will be moved to the right, Fig. 2, until it is stopped by abutment of the projection 28 with the head 10, thus withdrawing the high pressure plunger 30 completely from its high pressure cylinder 32, as shown in dotted lines in Fig. 2. The piston 40 will remain stationary during this movement of the piston 14 due to the restraining force of the spring 51. However, after the piston 14 has moved to the dotted line position, continued admission of air will cause the piston 40 to move to the left, against the pressure of spring 51. The low pressure plunger 38 will thereupon slice off the portion of the stick of grease projecting into the cylinder and force it into the high pressure cylinder 32.

After leftward movement of the low pressure plunger 38 is arrested by contact of its end with the end of the cylinder 50, the operator will remove his thumb from the thumb-piece 104 whereupon the air pressure within the cylinder 90 will act upon the piston valve 96, which, it will be remembered, is of greater effective area than piston valve 98, and return the piston valve mechanism to the position shown in Fig. 2. With the valves in this position the air between the pistons 14 and 40 escapes to the atmosphere through the cylinder portion 92, and air under pressure is admitted to the head end of cylinder 8 through the port 116. The compressed air entering the port 116 will force the piston 14 and its plunger 30 to the left and thereby discharge the lubricant in the cylinder 32 into the bearing to be lubricated.

The cross-sectional area of the plunger 30 may be made very much smaller than the cross-sectional area of the piston 14 so that the pressure at which the lubricant is forced from the cylinder 32 may be 100 to 150 times as great as the pressure of the compressed air. Since, in roundhouses and repair shops the air pressure for the operation of pneumatic tools is usually from 90 to 125 lbs. per square inch, it will be apparent that a pressure of from approximately 9,000 to 12,500 lbs. per square inch may be developed upon the lubricant in the cylinder 32. This pressure is ample rapidly and easily to force the very heavy lubricant employed into the most tightly fitted bearings.

The operation of discharging lubricant from the compressor may, of course, be repeated in rapid succession merely by operation of the thumb-piece 104 and feeding the stick of grease into the tube 74.

The invention is capable of wide variation within equivalent limits and I contemplate such variation as may be desirable or useful in the particular adaptation of the invention shown, or in its adaptation to other devices. I do not restrict myself in any unessential particulars, but what I claim and desire to secure by Letters Patent is:

1. A pneumatically-operated compressor comprising high and low pressure plungers connected in axial alignment, pistons secured thereto, intercommunicating cylinders for said plungers, a cylinder for said pistons, and means for alternately admitting an operating fluid between said pistons and at one end of said piston cylinder thereby first to cause operation of said plungers in opposite directions, and then reverse movement of one of said plungers.

2. In a device of the class described, the combination of an air cylinder, two pistons reciprocable therein, a low pressure plunger secured to one of said pistons, a cylinder therefor, a spring normally holding said plunger withdrawn from its cylinder, a high pressure plunger secured to the other piston, a cylinder therefor connected to said first named cylinder and means for admitting an operating fluid under pressure successively to withdraw said high pressure plunger from its cylinder, force said low pressure plunger into its cylinder, and subsequently force said high pressure plunger into its cylinder and permit withdrawal of said low pressure plunger from its cylinder.

3. In a device of the class described, the combination of an air cylinder, two pistons reciprocable therein, a low pressure plunger secured to one of said pistons, a cylinder therefor, a spring normally holding said plunger withdrawn from its cylinder, a high pressure plunger secured to the other piston, a cylinder therefor in communication with the first named cylinder, means to hold said pistons separated, and means for admitting an operating fluid under pressure successively between said pistons and at the opposite side of one of said pistons thereby to withdraw said high pressure plunger from its cylinder, force said low pressure plunger into its cylinder, and subsequently force said high pressure plunger into its cylinder and permit withdrawal of the low pressure plunger from its cylinder.

4. In a lubricant compressor of the class described, the combination of interconnected high and low pressure cylinders, a lubricant inlet port in said low pressure cylinder, plungers operable in said cylinders, said high pressure plunger extending through and guided in said low pressure plunger, resilient means to maintain said low pressure plunger withdrawn from its cylinder, an air cylinder, pistons connected to said plungers and operable in said air cylinder, means to admit an operating fluid between said pistons thereby to withdraw the high pressure plunger from its cylinder and to force said low pressure plunger into its cylinder, and means for admitting the operating fluid on the opposite side of said piston attached to the high pressure plunger to force the plunger into its cylinder and simultaneously permit the low pressure plunger to be withdrawn from its cylinder.

5. In a lubricant compressor of the class described, the combination of interconnected high and low pressure cylinders, a lubricant inlet port in said low pressure cylinder, plungers operable in said cylinders, said high pressure plunger extending through said low pressure plunger, a spring to maintain said low pressure plunger withdrawn from its cylinder, an air cylinder, pistons connected to said plungers and operable in said air cylinder, an aperture in said air cylinder to admit air under pressure between said pistons thereby to withdraw the high pressure plunger from its cylinder and to force said low pressure plunger into its cylinder, and means for admitting the compressed air on the opposite side of said piston attached to the high pressure plunger to force the plunger into its cylinder and simultaneously permit the low pressure plunger to be withdrawn from its cylinder.

6. A pneumatically-operated lubricant compressor comprising high and low pressure plungers, pistons secured thereto, connected cylinders for said plungers, a cylinder for said pistons, means for admitting an operating fluid between said pistons thereby to cause operation of said plungers in opposite directions, said means comprising manually operable differential substantially balanced piston valves, and means for admitting an operating fluid back of one of said pistons for driving said piston in a reverse direction.

7. A pneumatically-operated lubricant compressor comprising high and low pressure plungers, pistons secured thereto, connected cylinders for said plungers, a cylinder for said pistons, and valve means for admitting an operating fluid between said pistons thereby to cause operation of said plungers in opposite directions, said means comprising a pair of cylinders of slightly different diameters, a piston valve in each of said cylinders, a stem rigidly connecting said valves, and manually operable means connected to said stem, said means also adapted to admit an operating fluid back of one of said pistons for driving said piston in a reverse direction.

8. In a device of the class described, the combination of an air cylinder, two pistons reciprocable therein, a low pressure plunger secured to one of said pistons, a cylinder therefor, a spring normally holding said plunger withdrawn from its cylinder, a high pressure plunger secured to the other piston, a cylinder therefor, said low and high pressure cylinders being interconnected, and means for admitting an operating fluid under pressure successively to withdraw said high pressure plunger from its cylinder, force said low pressure plunger into its cylinder, and subsequently force said high pressure plunger into its cylinder and permit withdrawal of the low pressure plunger from its cylinder, said means comprising manually operable piston valves movable in one direction by the pressure of said operating fluid.

9. In a device of the class described, the combination of an air cylinder, two pistons reciprocable therein, a low pressure plunger secured to one of said pistons, a high pressure plunger secured to the other piston, cylinders for said plungers, means for admitting lubricant to one of said cylinders, a spring normally holding said low pressure plunger withdrawn from its cylinder, and means for admitting to said air cylinder an operating fluid under pressure successively to withdraw said high pressure plunger from its cylinder, force said low pressure plunger into its cylinder, and subsequently force said high pressure plunger into its cylinder and permit withdrawal of the low pressure plunger from its cylinder.

10. A high pressure lubricant compressor comprising an air cylinder, a plurality of pistons therein, a plurality of concentric plungers, one connected to each of said pistons, connected cylinders for said plungers, and means for admitting air under pressure into said air cylinder thereby alternately to force one of said plungers into its cylinder and retract another of said plungers from its cylinder.

11. A high pressure lubricant compressor comprising an air cylinder having a plurality of air ports therein, a plurality of air actuated pistons in said cylinder, a plurality of concentric plungers, one connected to each of said pistons, connected lubricant cylinders for said plungers, and a single valve means to control admission of air under pressure to said air cylinder through any one of said ports, thereby to cause relative movement between said pistons.

12. A high pressure lubricant compressor comprising a pair of aligned lubricant cylinders of different size arranged in end to end communication with one another, a piston operable in the larger of said cylinders, a plunger operable in the smaller cylinder, a fluid pressure cylinder adjacent said lubricant cylinders, and fluid pressure operated means connected to said plunger and piston, respectively, successively to cause withdrawal of said plunger from its cylinder, movement of said piston into its cylinder, movement of said plunger into its cylinder, and retraction of said piston.

13. A pneumatically operated lubricant compressor comprising high and low pressure plungers, a piston secured to each of said plungers, intercommunicating cylinders for said plungers, a cylinder for said pistons, and means for admitting an operating fluid between said pistons, thereby to cause operation of said plungers in opposite directions.

In witness whereof, I hereunto subscribe my name this 23 day of April, 1928.

NORMAND W. MORSE.